United States Patent Office 3,632,855
Patented Jan. 4, 1972

3,632,855
ROSIN-FATTY OLEFIN EPOXIDE REACTION PRODUCTS
Noah J. Halbrook, Walter H. Schuller, and Ray V. Lawrence, Lake City, Fla., assignors to the United States of America as represented by the Secretary of Agriculture
No Drawing. Filed Mar. 13, 1969, Ser. No. 807,103
Int. Cl. C07c 69/76
U.S. Cl. 260—468.5                                  3 Claims

ABSTRACT OF THE DISCLOSURE

This invention relates to a composition of matter formed by the reaction of one mole of rosin acid with one mole of a fatty olefin epoxide to give a hydroxy ester, useful as a tackifier in SBR rubber. It further relates to the reaction of the hydroxy ester with ethylene oxide to give a product useful as a wetting agent. It also relates to the reaction product of the hydroxy ester with a second mole of rosin to give a diester, which is also useful as a tackifier for SBR rubber.

A non-exclusive, irrevocable, royalty-free license in the invention herein described, throughout the world for all purposes of the United States Government, with the power to grant sublicenses for such purposes, is hereby granted to the Government of the United States of America.

The fatty olefin epoxides used in the present work are commercially available materials. They are called Nedox 1114 ($C_{11}$–$C_{14}$) chain lengths where R=$C_9$ to $C_{12}$ saturated straight chains in the formula

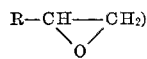

and Nedox 1518 (where the chain lengths are $C_{15}$ to $C_{18}$) and R=$C_{13}$ to $C_{16}$ saturated straight chains in the formula

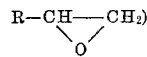

The term rosin is used interchangeably to apply to gum, wood, and tall oil rosin, especially disproportionated rosins and more particularly, dehydroabietic acid which is depicted by the structural formula

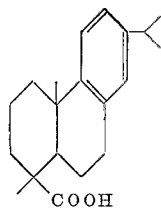

The latter two products are especially useful in that they are most resistant to air oxidation—an important feature in their use as rubber tackifiers.

The formulas of the products of the present invention can be described as follows:

(a) Hydroxy ester:

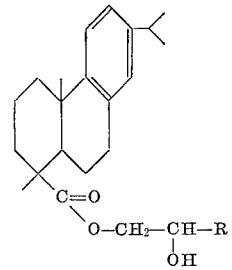

where R=$C_9H_{19}$— to $C_{16}H_{33}$ (b) Hydroxy ester reacted with ethylene oxide:

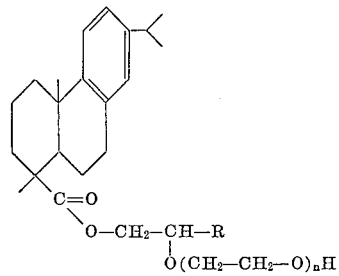

where R=$C_9H_{19}$—to $C_{16}H_{33}$
and n=9 through 20.

(c) Diester:

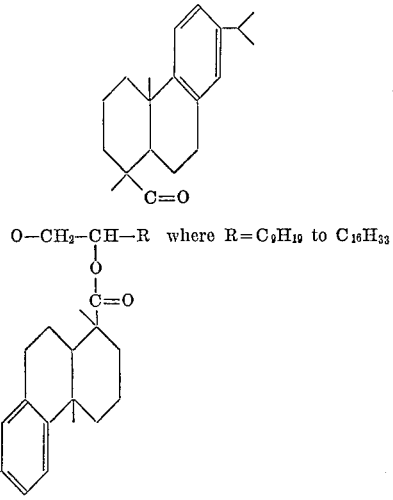

where R=$C_9H_{19}$ to $C_{16}H_{33}$

The fatty olefin epoxides react very rapidly with rosin in the presence of an alkaline catalyst such as calcium hydroxide or potassium hydroxide. The hydroxy ester is reacted with a second mole of rosin in the presence of the alkaline catalyst used in the preparation of the monoester. The amount of catalyst used varies from 0.5% to 3.0% based on the weight of the rosin with an optimum weight of 1.0%.

The temperatures used in preparing the monoester can be varied from 170° to 230° C. with the optimum temperature around 190° C. Solvents can be employed but are not necessary. The reaction times can be varied from 5 minutes to 1 hour. Sufficient heating is usually applied until an acid number around 0–3 is obtained. This is usually obtained in 10 minutes at 190° C.

The reaction of the monoester with ethylene oxide can be carried out under pressure, or at atmospheric pressure merely by recycling the ethylene oxide through the molten monoester. A temperature range of 165° to 200° C. can be employed with a preferred temperature of 175–185° C. being applied. A catalyst such as potassium or sodium hydroxide is necessarily added in the amount of from 0.25 to 3.0% based on the weight of the monoester with a preferred concentration of 0.5% being used. A solvent can also be employed but is not necessary. The amount of ethylene oxide reacted is determined by the weight gain of the hot reaction mixture.

The reaction of the hydroxy ester with a second mole of rosin can also be carried out in the presence or absence of a solvent. Again, a basic catalyst is generally used in the range of 0.25% to 1.5% but preferably in the amount of 0.5% based on the weight of the rosin. The temperature range employed is 230–250° C. with the preferred range being 240–245° C. The mixture is heated until the acid number falls to within the range of 0–10, preferably around 4–5. This usually requires about 10–14 hours at 240–245° C.

The monoester and diester showed excellent tack strength in SBR-1006 formulated rubber as compared to a commercially used tackifier, namely Galex NXD.

The ethylene oxide reaction product containing 10 moles of ethylene oxide per mole of monoester was about in the same range of effectiveness as a wetting agent as potassium oleate, as measured by the standard Drave's tests.

It should be noted that the "diester" constitutes what can be conceived of as a new type of modified ester gum, that is, a glycol ester of rosin containing a long fatty chain.

It should also be pointed out that in the preparation of the monoester and diester, the color of the final product can be considerably improved by washing out the catalyst with mineral acids, preferably hydrochloric acid or sulfuric acid.

EXAMPLE 1

Preparation of the monoester of Nedox 1114 and disproportionated rosin.—A flask is charged with 171 g. (0.5 mole) of disproportionated rosin [acid number 162, hydroxyl number 26, saponification number 183 (saponification 3 hours at reflux temperature in 2 N ethanolic potassium hydroxide)] containing about 70% or dehydroabietic acid and about 30% of di- and tetrahydroabietic acids, plus 2.0 g. of the rosin which is ground with 1.7 g. of calcium hydroxide (about 1% on total weight of the rosin). The flask is equipped with a stirrer, nitrogen inlet tube, thermometer and water trap. A slow current of nitrogen is passed through the flask. The temperature is raised to 210° C. by means of a Glas-col heater and stirring commenced as soon as the mixture is sufficiently fluid. Heating is carried out for about 15 minutes to allow for reaction of calcium hydroxide and removal of the water formed. The flask is charged with 110 g. (0.5 mole of oxirane by analysis) of Nedox 1114 and the temperature held at 190° C. for 15 minutes. During this period the acid number drops to zero. The hydroxy ester has a color grade, USDA rosin scale, of K and a viscosity of 41 poise. The hydroxyl number is 119 and the saponification number 94. The UV spectrum is similar to the starting rosin. The infra spectrum (neat) shows $\lambda_{max}$ 2.94μ (hydroxyl), 5.80μ (ester) and no absorption in the carboxyl region. The ester is soluble in acetone, ethanol, ethylacetate, ether, benzene, isooctane, chloroform, and petroleum ether; insoluble in water and cold acetonitrile.

A 20 g. portion of the ester is dissolved in ether and washed with 1 N hydrochloric acid to remove the calcium salts, then the solution is washed with water to neutrality. The solution is dried over sodium sulfate and stripped under reduced pressure to dryness. The product exhibits USDA color grade WW, hydroxyl number 119, saponification number 104, viscosity 41 poise.

EXAMPLE 2

Preparation of the diester of Nedox 1114 and disproportionated rosin.—The monoester prepared in Example 1 above (170 g.; 0.3 mole) is added to 104 g. (0.3 mole) of disproportionated rosin (analysis given in Example 1). The mixture is blanketed with nitrogen, heat applied, and stirring started. The reaction mixture is held at 230–235° C. for 13 hours during which time the acid number drops to 4.4 and the hydroxyl number to 19. The diester is of USDA color grade N, and ball and ring softening point of 38.5° C. The ultraviolet absorption spectrum was similar to the starting rosin. The infrared spectrum (neat) shows only very small absorption in the hydroxyl and carboxyl regions. An ether solution (20%) of the diester was washed with 1 N hydrochloric acid to remove the calcium salts, then with water until neutral. The ether solution was dried and stripped under reduced pressure. The product exhibited acid number 5.4, hydroxyl number 19, ball and ring softening point 38.5° C. and USDA color grade WG.

EXAMPLE 3

Disproportionated rosin-Nedox 1114 monoester reacted with ethylene oxide.—A monoester is prepared as described in Example 1 except that the catalyst used is 1% by weight of potassium hydroxide on the weight of the rosin. The acid number drops to zero in 5 minutes at 190° C. Ethylene oxide was then bubbled through the liquid monoester at 180° C. Unreacted ethylene oxide is trapped in an ice cooled condenser and recirculated. A total of 9.7 equivalents of ethylene oxide added on to the monoester in 4 hours as determined by weight gain. In order to remove the catalyst, a 100 g. sample of the ethylene oxide condensate is dissolved in 500 ml. of ether, washed with 1 N hydrochloric acid saturated with sodium sulfate and then with water saturated with sodium sulfate. The ether solution is dried over sodium sulfate and the solvent stripped under reduced pressure and dried; acid number 4.6, saponification number 61; USDA color grade N; viscosity 6.27 poise. The product is soluble in acetone, chloroform, ether, ethyl acetate; it gives a cloudy solution in water and in acetonitrile and is partly soluble in isooctane.

EXAMPLE 4

Disproportionated rosin-Nedox 1518 monoester.—The reaction is carried out in the same fashion as the preparation of the monoester in Example 1. Nedox 1518 was reacted with disproportionated rosin containing about 70% dehydroabietic acid (analysis given in Example 1). The reaction temperature is 190° C. for 15 minutes. During this time the acid number drops to zero; USDA color grade K; viscosity 56 poise; hydroxyl number 112; saponification number 87 (determined as described in Example 1). The infrared spectrum exhibited

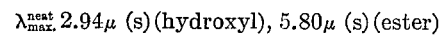

$\lambda_{max.}^{neat}$ 2.94μ (s)(hydroxyl), 5.80μ (s)(ester)

and no absorption in the carboxyl region. The monoester was soluble in acetone, alcohol, ethyl acetate, ether, benzene, isooctane, chloroform, and petroleum ether while insoluble in water and in acetonitrile.

The catalyst is removed by acid washing as described in Example 1. The product has color grade WW; hydroxyl number 112; saponification number 96; and viscosity 56 poise.

EXAMPLE 5

Disproportionated rosin-Nedox 1518 diester.—The diester is prepared from the monoester prepared in Example 4 and as is described in Example 2. Nedox 1518 was used in the preparation of the monoester and disproportionated rosin used in the preparation of the mono and diester (analysis of disproportionated rosin given in Example 1). The reaction mixture is held at 240–245° C. for 11 hours during which time the acid number drops to 4.0. The product exhibits a color grade N, ball and ring softening point 36° C.

EXAMPLE 6

Disproportionated rosin-Nedox 1518 monoester modified with ten equivalents of ethylene oxide.—A monester is prepared as described in Example 4 except that as a catalyst, 1% by weight of potassium hydroxide is used based on the weight of the rosin. During a 10 minute heating time at 190° C., the acid number drops to zero; hydroxyl number 106; saponification number 87; USDA color grade K; viscosity, 56 poise. Ethylene oxide is added as described in Example 3 at 180° C. for 2.5 hours. Ten moles of ethylene oxide reacts. The product exhibits USDA color grade K and a viscosity of 6.27 poise.

A sample was washed free of catalyst as described in Example 3. The product exhibits acid number 4.2; viscosity 6.27 poises; USDA color grade M. The product is soluble in acetone, chloroform, ether, and ethyl acetate. It gives a cloudy solution in water and acetonitrile and is partly soluble in isooctane.

EXAMPLE 7

Disproportionated rosin-Nedox 1518 monoester modified with twenty equivalents of ethylene oxide.—The product from Example 6 was reacted further with ethylene oxide in a similar fashion at 175–180° C. for 3 hours. The total equivalents of ethylene oxide combined with the monoester were 20 in all.

EXAMPLE 8

Wetting activity measurement.—The ethylene oxide adduct prepared in Example 6 is tested for wetting activity by means of the standard A.A.T.C.C. method or as it is commonly known, the Drave's test (see "Textile Testing" by J.H. Skinkle, Chemical Publishing Co., Inc., Brooklyn, N.Y. (1949) and also "Wetting Agents, Evaluation of," Standard Test Method, A.A.T.C.C. 17–1952 of the American Standards Association: ASA No. L14.11–1956).

SUMMARY OF DRAVE'S TEST AT 77° C.

|  | Concentration, percent | Time,[1] sec. |
|---|---|---|
| Product from Example 6 (monoester plus 10 moles of ethylene oxide) | 0.50 | 75 |
| Potassium oleate | 0.50 | 40 |

[1] Time required for the cotton skein to wet and relax the tension on the string attached to a weight at the bottom of a graduated cylinder containing the solution.

It is thus seen that the product from Example 3 is approximately as good a wetting agent as the commercially available wetting agent, potassium oleate.

EXAMPLE 9

Evaluation as Tackifier for SBR Rubber.—The products made in Example 4 (monoester) and Example 5 (diester) from Nedox 1518 were evaluated as SBR rubber tackifiers as follows.

The rubber is milled to a smooth sheet and the other ingredients added. The composition is as follows.

| | Parts |
|---|---|
| SBR-10006 | 100 |
| EPC black | 40 |
| Zinc oxide | 5 |
| Stearic acid | 1.5 |
| Tackifier | 5 |

Samples are molded for 5 minutes at 230° F. and 1,000 p.s.i. to give 2 pieces 1 inch long and ⅜ inch in diameter, with one smooth face that is in contact with a Teflon disk inserted in the middle of the piece before molding. Tack measurements were made on the Instron Tester. The samples are held together under a contact pressure of 10 p.s.i. and pulled apart at a rate of 10 i.p.m. The tack measurement is then made by placing the two 1-inch x ⅜-inch diameter specimens in the drill chucks and clamped. The smooth ends, which were in contact with the Teflon disk during molding, were brought together under a contact pressure of 10 p.s.i. and held together for the desired length of contact time. At the end of this time, the crosshead was pulled apart at a speed of 10 i.p.m. and the force required to pull the specimens apart was recorded on chart paper. This force is then converted to tack strength.

RUBBER-TACKIFIER TEST RESULTS IN SBR-1006 FORMULATIONS

| | Tack strength, p.s.i., with indicated tackifier | | | |
|---|---|---|---|---|
| Contact time, min. | None | Galex NXD | Product Example 4 (monoester) | Product Example 5 (diester) |
| ½ | 3 | 3 | 14 | 11 |
| 1 | 4 | 4 | 12 | 12 |
| 2 | 6 | 10 | 14 | 12 |
| 3 | 9 | 11 | 20 | 11 |
| 5 | 10 | 15 | 16 | 11 |
| 15 | 13 | 26 | 26 | 26 |
| 30 | 17 | 31 | 20 | 33 |
| 60 | 24 | 54 | 46 | 34 |

Galex NXD is a commercially used rubber tackifier for the SBR–1006 formulation. It will be noted that the monoester and the diester of the present invention are superior to Galex NXD at short contact times and as good as Galex NXD at longer contact times.

EXAMPLE 10

Gum rosin-Nedox 1114 monoester.—The monoester is prepared as described in Example 1 except that gum rosin is used in place of disproportionated rosin. The gum rosin used has an acid number of 165, USDA color grade of WW, and hydroxyl number of 24. The gum rosin and Nedox 1114 are reacted for 15 minutes at 190° C. and the acid number drops to zero. The product exhibits a USDA color grade of K, a viscosity of 46.3 poise, a hydroxyl number of 122 (hydroxyl number is calculated as equivalents in mg. of potassium hydroxide per gram of ester), and a saponification number of 98. The ultraviolet absorption spectrum is generally similar to the starting rosin. Some isomerization of the rosin acids to abietic acid is indicated by the increase in $\alpha$ at 242 m$\mu$ from 32 in the starting rosin to 41 in the ester. The infrared spectrum (neat) shows $\lambda_{max.}$ 2.94$\mu$ (hydroxyl), 5.80$\mu$ (ester), and no absorption for carboxyl. The ester is soluble in acetone, alcohol, ethyl acetate, ether, benzene, isooctane, chloroform and pet ether; insoluble in water and cold acetonitrile.

A portion of the ester is washed with acid as described in Example 1 to remove the catalyst. The cleaned product exhibits a USDA color grade of WW; hydroxyl number 122, saponification number 111.5, viscosity 46.3 poise.

EXAMPLE 11

Gum rosin-Nedox 1114 diester.—The diester was prepared from the monoester prepared in Example 10 according to the procedure described in Example 2. The monoester which contained the catalyst used in its preparation was used in the preparation of the diester. The reaction mixture was held at 230–235° C. for 13 hours during which time the acid number dropped to 3.8. The diester exhibits USDA color grade N; ring and ball softening point 36.5° C.; and hydroxyl number 24. The ultraviolet absorption spectrum was generally similar to the starting material with some increased isomerization to abietic acid observed [$\lambda_{max.}$ 242 m$\mu$ ($\alpha$54.0)]. The infrared spectrum exhibited only a slight absorption in the region for hydroxyl and carboxyl. An ether solution (20%) of the diester was washed with 1 N hydrochloric acid to remove the calcium salts, then with water until neutral. The ether solution was dried over sodium sulfate, the ether removed under reduced pressure, and the sample dried in vacuo. The product exhibited an acid No. of 4.4, hydroxyl No. 23, ring and ball softening point of 36.5° C. and USDA color grade of WG.

EXAMPLE 12

Gum rosin-Nedox 1114 monoester reacted with ethylene oxide.—A gum rosin-Nedox 1114 monoester was prepared and reacted with ethylene oxide as described in Example 3. During 21 hours, 10.0 moles of ethylene oxide per mole of monoester is reacted. The catalyst is removed by washing with dilute mineral acid as described in Example 3. The final product exhibits an acid number of 4.6; a saponification number of 61; a USDA color grade of N; and a viscosity of 6.27 poise. The product is soluble in acetone, chloroform, ether, and ethyl acetate. It gives a cloudy solution in water and acetonitrile and is partly soluble in isooctane.

We claim:
1. A compound represented by the formula

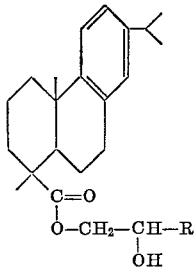

where $R=C_9H_{19}$ to $C_{16}H_{33}$.

2. A compound represented by the formula

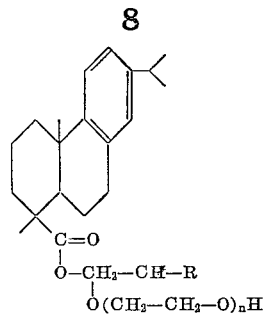

where $R=C_9H_{19}$ to $C_{16}H_{33}$ and $n=9$ through 20.

3. A compound represented by the formula

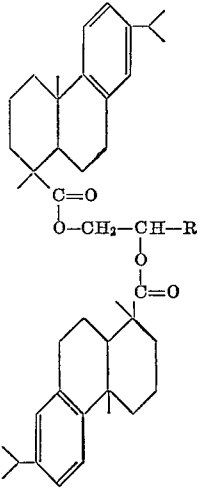

where $R=C_9H_{19}$ to $C_{16}H_{33}$.

References Cited

UNITED STATES PATENTS

| | | | |
|---|---|---|---|
| 1,817,425 | 8/1931 | Steimmig et al. | 260—103 |
| 2,590,910 | 4/1952 | Wittcoff et al. | 260—468.5 |
| 3,321,500 | 5/1967 | Katzschmann | 260—496 |

LORRAINE A. WEINBERGER, Primary Examiner

R. GERSTL, Assistant Examiner

U.S. Cl. X.R.

252—356; 260—85.1